June 7, 1938. L. E. WELLS 2,120,120
METHOD OF MAKING RIBBED SEPARATORS
Filed July 17, 1934 3 Sheets-Sheet 2

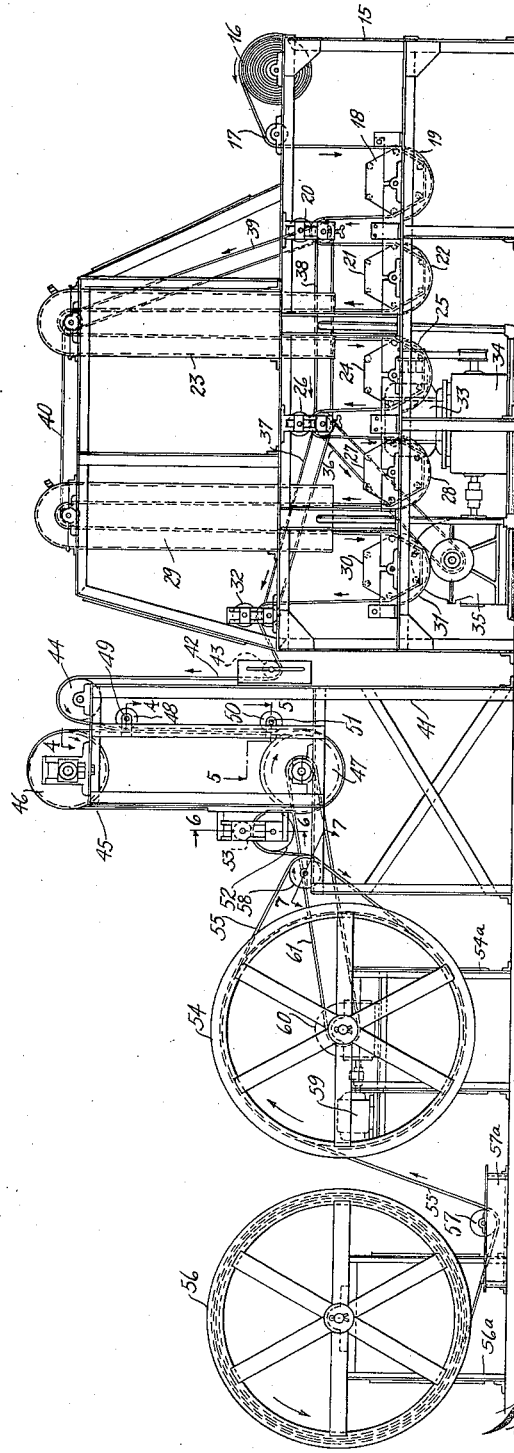

INVENTOR
LELAND E. WELLS
Kwis, Hudson & Kent
ATTORNEYS

June 7, 1938.   L. E. WELLS   2,120,120
METHOD OF MAKING RIBBED SEPARATORS
Filed July 17, 1934   3 Sheets-Sheet 3
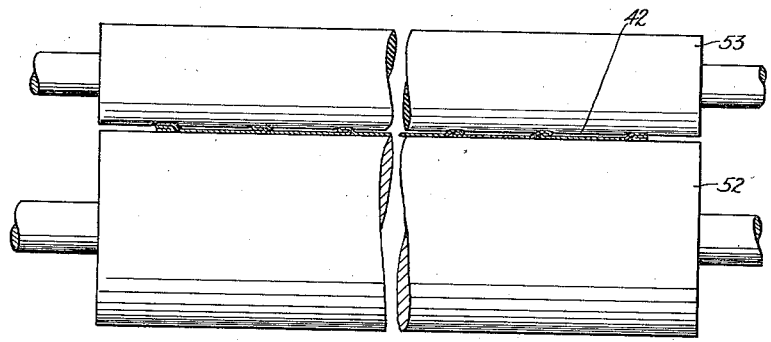
Fig. 6
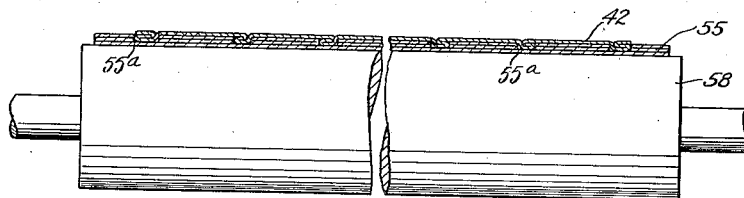
Fig. 7
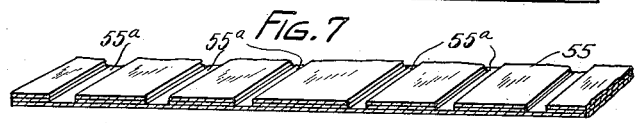
Fig. 8
Fig. 14
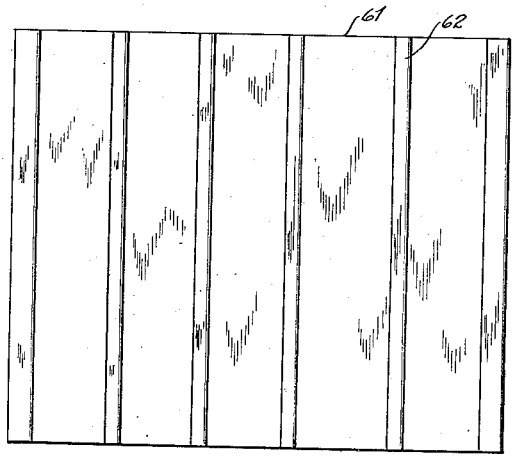
Fig. 9
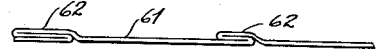
Fig. 10
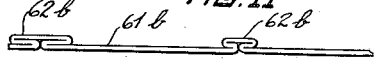
Fig. 11
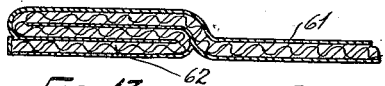
Fig. 12
Fig. 13
INVENTOR
LELAND E. WELLS
Kwis, Hudson & Kent
ATTORNEYS Patented June 7, 1938

2,120,120

UNITED STATES PATENT OFFICE 2,120,120

METHOD OF MAKING RIBBED SEPARATORS

Leland E. Wells, Cleveland Heights, Ohio, assignor to Willard Storage Battery Company, Cleveland, Ohio, a corporation of West Virginia Application July 17, 1934, Serial No. 735,719

4 Claims. (Cl. 136—148)

This invention relates to a process of making ribbed separators for electric storage batteries, and has for its chief object to provide a process by which integral ribs are formed on the separators and to form the ribs in a manner such that the ribbing process and in fact the process of forming the separators as a whole can be carried out inexpensively while at the same time separators are formed which are very satisfactory from the standpoints of strength, life and performance in a battery.

More particularly it is an object of the invention to form the ribs by a continuous process from a long strip or sheet which at the proper stage of the process of making the separators is acted on by the ribbing mechanism to form integral ribs extending longitudinally of the strip and spaced at proper intervals transversely thereof and which is subsequently cut into sections of the proper size to form storage battery separators.

While I do not regard my invention in its broad aspects as limited to any particular strip or sheet of separator forming material, my invention is particularly effective when employed in connection with the material and process described and claimed in an application filed in the name of Willard L. Reinhardt and myself, Serial No. 698,860, filed November 20, 1933 for Microporous diaphragm and method of making the same.

In the application referred to, there is described a diaphragm or separator permeated by pores of microscopic size of the character more fully described in Letters Patent of the United States No. 1,745,657 and No. 1,831,406 granted to Hermann Beckmann. The separator of application Serial No. 698,860, while having the microporous characteristics of the Beckmann products, consists of a sheet of porous material preferably open weave cotton fabric coated on both sides with microporous rubber and having its interstices filled with the same material, the rubber on both sides of the fabric and through the fabric being continuous, resulting in a separator having ample strength, high porosity, and other desirable characteristics of a satisfactory separator. In said application Serial No. 698,860 the microporous rubber which coats and fills the interstices of the inner fabric sheet is formed from latex or other dispersed rubber solution in a very unique manner, the sheet being first passed through a gelling solution and then through the dispersed rubber solution which, for convenience, will be referred to as latex, so as to form a gel-coated within and on both sides of the sheet, the gel-coated being a reticulous body with inter-aggregate pores of microscopically visible size occupied by the latex liquid. Subsequently, the sheet composed of the gel-coated and fabric is cured or vulcanized, while the liquid remains interstitially included in the gel-coated, thereby fixing the rubber in reticulous microporous structure.

At a suitable stage of the process ribs are formed on or applied either to the sheet or to the finished separator, and as disclosed in said application, rib forming material in the form of strips or strands is laid onto the gel-coated fabric when it is passing through the machine, after which the fabric is wound onto a drum which is conveyed to a vulcanizer and the vulcanizing is accomplished in a wet condition so as to keep the liquid of the gel-coated in the pores until the curing is completed. After this operation the sheet is cut into sections of the proper size for use as separators or insulators in storage batteries.

With the present invention, the process is preferably carried out as in said application Serial No. 698,860, up to the point where the rib forming material is applied, but instead of forming ribs by causing rib forming strips or strands to adhere to and to be subsequently vulcanized to the gel-fabric sheet, the sheet, while passing through the machine, is acted upon by suitable instrumentalities so as to form folds or pleats which form integral ribs of the finished separator. The folds thus formed in the gel-covered sheet may be allowed to stand out at right angles to the surface of the sheet or may be folded over in contact therewith, depending upon the character or the shape of the ribs that may be desired, but, in any event, the folded or creased portions adhere together, and, during the subsequent vulcanizing operation, become vulcanized to each other or both to each other and to the surface of the sheet if the creased portions are folded over against the latter.

The character of the material with which the sheet is coated at the rib forming stage of the process is such that the ribs can be formed very effectively, but the present process is not confined to the formation of ribs on a separator forming sheet of the type described above.

The invention may be further briefly summarized as consisting in certain novel steps of the improved process which will be described in the specification and set forth in the appended claims.

In the accompanying sheets of drawings wherein I have shown an embodiment of the invention which operates very efficiently, Fig. 1 is a side elevation of the equipment which may be used in carrying out the process;

Fig. 6 is a view through the ribbed strip substantially along the line 6—6 of Fig. 1, with the middle portions of the strip and adjacent rolls broken away;

Fig. 7 is a sectional view taken substantially along the line 7—7 of Fig. 1, illustrating the manner in which the formed ribs on the sheet are protected by the grooves of a flexible liner which is fed onto the drum with the ribbed sheet, with the middle portions of the rolls, ribbed strip, and liner broken away;

Fig. 8 is a fragmentary sectional view, on an enlarged scale, taken through the liner;

Fig. 9 is a face view of one of the finished separators;

Figs. 10, 11 and 12 are fragmentary transverse sectional views of finished separators showing different forms that the ribs may take;

Fig. 13 is an enlarged fragmentary sectional view illustrating the manner in which overlying folds of the rib forming material are vulcanized into a solid continuous body from one side of the rib to the other; and Fig. 14 is a cross-sectional view of the ribbed strip.

Figure 3:
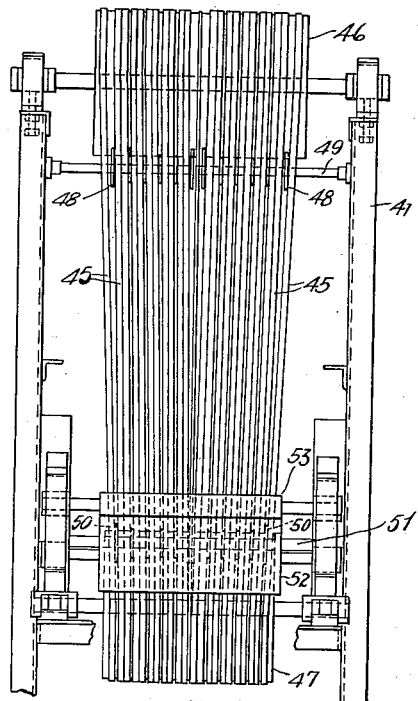
Fig. 3 is a face view of the same.

Referring now to the drawings, 15 represents a suitable framework for a portion of the apparatus used in carrying out the process of making separators with integral ribs in accordance with the present invention. The porous material which is treated and operated on in passing through the machine is fed from a roll 16 supported at the righthand end of the frame 15, as the same is viewed in Fig. 1. This material is porous, and, while it is preferably in the form of a woven cotton fabric with an open weave, it is not necessarily in the form of woven fabric. However, for convenience it will be referred to as fabric. As the fabric is fed from the roll 16 it passes over a guide roller 17 and then down about the periphery of a rotatable drum 18 extending down into a trough 19 containing a suitable coagulant in liquid form, such as magnesium sulphate. As it passes through this bath, the fabric becomes saturated with the coagulant and it passes upwardly between a pair of squeeze rolls 20 and then around a second drum 21 which extends down into a trough 22 containing latex or other dispersed rubber solution. As the latex comes in contact with the sheet saturated with the coagulant, the latex immediately coagulates on both sides and in the interstices of the fabric and is then in the condition fully described in the Beckmann patents and in application Serial No. 698,860. Next the sheet is passed through a steam chamber 23 which immediately sets the gel thus formed, the fabric extending up through the bottom of the chamber around a roller at the top thereof and then down and out from the lower end of the chamber. The fabric may be passed any desired number of times through similar baths and steam chambers, depending upon the thickness of the microporous rubber film desired on each side of the fabric. In this instance it is given a second series of treatments similar to those just described. The fabric, after it emerges from the lower end of the steam chamber 23, extends down around a drum 24 extending into a trough 25 containing a coagulant, such as magnesium sulphate, and then again upwardly between a pair of squeeze rolls 26 and then downwardly around a drum 27 in a trough 28 containing the latex, then through a steam chamber 29 to again set the gel thus formed, this chamber being similar to the chamber 23, and then down around another drum 30 which dips down into a trough 31 containing water. After passing around the drum 30, the sheet now coated and filled with gel which is permeated with the microscopically visible pores filled with the latex liquid passes upwardly between a pair of rolls 32 and then to the rib forming part of the equipment. The rolls 32 do not close the net-work of microscopic liquid filled pores of the gel.

The various rollers and drums referred to are rotatably supported on the frame 15 and part of them are driven in the following manner. Power is obtained from a motor 33, and from here the drive is through reducing gears in a gear box 34 and then through further reducing gears in a gear box 35. The gear box 35 has a driven pulley which by a belt 36 drives the lower of the two squeeze rolls 26 and from here the drive is taken by a belt 37 to the lower of the rolls 32, and also the drive is taken from the lower of the squeeze rolls 26 by a belt 38 to the lower of the squeeze rolls 20 and from the latter by a belt 39 around the roller at the top of the steam chamber 23 and from the latter roller by a belt 40 to the roller at the top of the second steam chamber 29.

Figure 2:
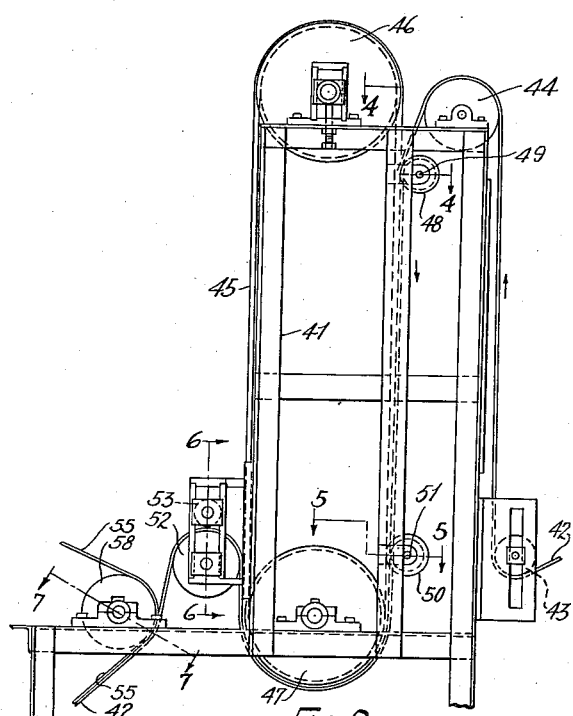
Fig. 2 is a view on a somewhat enlarged scale showing the rib forming mechanism.

Adjoining the frame 15 is a second frame 41 which supports the rib forming mechanism. The treated fabric sheet, which is here designated 42, as it emerges from between the rolls 32 passes down around a tensioned idler roller 43 supported on the frame 41 and then up around a roller 44 at the top of the frame 41. Then the fabric passes down in contact with a series of V-belts 45 which pass about an upper grooved drum 46 and about a lower grooved drum 47, the latter being supported a suitable distance directly beneath the drum 46. The treated fabric sheet 42 passes down in contact with the downwardly traveling portions of these V-belts in the manner indicated by the arrows in Fig. 2. It will be noted that the grooves in the upper drum 46 are farther apart than the grooves of the lower drum 47, and, as will be seen by reference to Fig. 3, the belts are therefore farther apart when passing around the upper drum than when passing around the lower drum and that between the drums the belts approach each other, while, as they pass around the lower drum, they are nearly in contact with each other.

Figure 4:
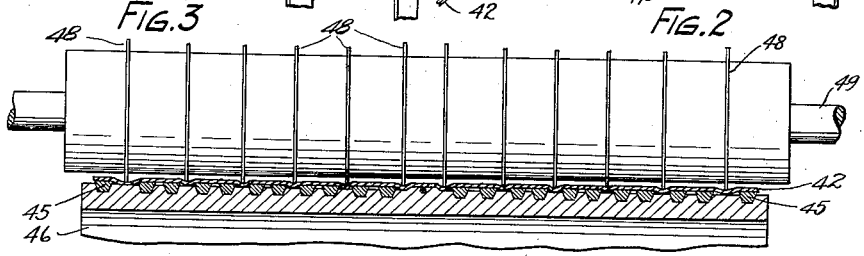
Fig. 4 is a sectional view substantially along the irregular line 4—4 of Fig. 2.

A short distance below the upper drum 46 the treated sheet 42 is brought into contact with the downwardly traveling portions of the V-belts by a series of disks 48 carried by a rotatable shaft 49, which disks engage the fabric and press the same inward slightly between certain of the V-belts in the manner illustrated in Fig. 4. This operation initiates the formation of the rib-forming folds in the sheet. It will be noted that the two outermost belts at each end of the drum 46 and the two innermost belts (see Fig. 4) are somewhat farther apart than the remainder, and that the outermost disks 48 and the two innermost disks are somewhat larger in diameter than the remaining disks. This is for the purpose of permitting the formation of deeper folds along the side edges of the strip and at the middle thereof than at other points. In this instance the rib forming equipment is so constructed that the strip which is received thereon and ribbed is of double separator width.

Lower down and in fact just above the lower grooved drum 47, the sheet is again contacted by a plurality of disks 50 supported by a rotatable shaft 51. These disks are somewhat larger in diameter than the corresponding disks of the upper shaft and they press the portions of the sheet grooved by the upper set of disks deeper or farther inward between the now more closely arranged V-belts, and as the sheet passes around the lower drum still in contact with the V-belts, the folds which are formed in the sheet by the disks 50 are pinched together and the inner sides of the folds now adhere to each other, due to the fact that the gel which coats the fabric will adhere strongly to another gel-coated portion but does not adhere to any extent to any other part of the equipment which is not gel-coated.

Figure 5:
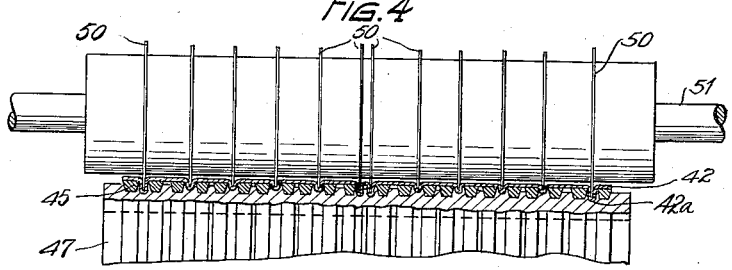
Fig. 5 is a sectional view substantially along the line 5—5 of Fig. 2.

As will be clear from the above, these folds, which are designated 42ª, either constitute the integral ribs of the finished separator or are bent over so as to lie against the side of the sheet, as in this instance with the rib-forming mechanism here shown, depending upon the desired character and shape of the ribs. If the ribs are to be in the form of folds which stand out at right angles to the face of the sheet, as indicated in Fig. 5 and in Fig. 11 (to be referred to presently) the sheet will pass directly to the drum which receives the sheet and which supports the wound up sheet during vulcanization. On the other hand, if the ribs are to be laid over against the sheet, as indicated for example in Fig. 10 to be referred to presently, the folds are pressed down by suitable means. In this instance the sheet, with the equally spaced folds formed on its surface and projecting inwardly between the closely spaced V-belts, passes around the lower half of drum 47 and follows the belts up to a point where they begin to separate and then it leaves the belts and passes upwardly and outwardly around a smooth surfaced drum 52 (see Figs. 2 and 3), and as the sheet passes over this drum the ribs are pressed down by a roller 53 and the side of each fold which is pressed down against the flat surface of the sheet is thus caused to adhere strongly to the latter, forming the equivalent of pleats. The sheet is now wound onto a drum 54, but to keep the convolutions of the gel-surfaced sheet from adhering to each other and also to protect the rib-forming folds or pleats, there is wound onto the drum at the same time a special liner 55 shown in Figs. 1, 7 and 8. This liner which corresponds to the width of the sheet, is of course flexible and has channels 55ª formed therein extending lengthwise thereof, the spacing, width, and depth of these channels corresponding to the spacing, width, and depth of the folds or pleats which are formed on the sheet.

The liner is preferably formed of fabric coated in part with rubber, the rubber, of course, being cured, and the number of plies in the liner depending upon the required depth of the channels to accommodate the folds or pleats. The liner is preferably made in the following manner. The base or backing is a single ply of heavy fabric which is coated on the upper side only with soft rubber compound by means of frictioning. The other plies consist of rubber strips superposed on the backing. The second ply is a layer of fabric which is coated on both sides. The upper ply, if three plies only are used, (more than three plies may be employed if desired), is coated on the lower side only. The second and third plies, when rubber-frictioned, are in the form of sheets, and these are then split into ribbons and are applied at such spaced intervals that the spaces between the ribbons correspond to the width, depth, and spacing of the ribs. It will be understood that if the depth of the ribs requires it, the liner may be composed of more than three plies made in the manner just explained, but, in any event, the lower side of the backing sheet and the outer surface of the uppermost ply are substantially free of rubber. However, the liner may be made in other ways and of other materials than those mentioned.

This liner has numerous advantages among which is the fact that it provides a continuous strip in the nature of a mold of minimum weight and maximum flexibility. It is peculiarly adapted for use in connection with a ribbed gelled sheet in the respect that it will absorb a considerable quantity of water, which is desirable in the subsequent curing process. Furthermore, it can be made at relatively low cost, and, if constructed as above described, the web of the sheet is not in contact with low sulphur content rubber during the curing process. Otherwise there might be a migration of the sulphur from the gel and a consequent reduction in the rigidity of the finished separator.

The liner is unwound from a drum 56 and passes around a roller 57, dipping down into a water tank 57ª as it is desired that the liner be soaked with water before contacting with the ribbed, gel-coated sheet, the roller 57 and tank 57ª being located below and between the drums 54 and 56. The liner then passes upwardly around the top of the drum 54 and around an idler drum 58 where it meets the ribbed sheet with the channels of the liner facing and receiving the ribs or pleats of the sheet. The liner and ribbed sheet are then wound on the drum 54 in the manner indicated in Fig. 1.

When a sufficient amount of the ribbed sheet and the liner is wound on the drum 54, the latter is removed from its shaft which is supported on an auxiliary frame 54ª and is carried to a vulcanizer where the gel is cured into hard rubber. Wet vulcanization is of course required so that during the vulcanizing or curing operation the water contained in the gel is prevented from escaping until after the curing is completed. In other words, the vulcanization is carried on in accordance with the Beckmann patents and application Serial No. 698,860 so as to form microporous rubber in and on the surfaces of the fabric, the rubber on the surfaces of the fabric being preferably thinner than the fabric itself, as fully described in application Serial No. 698,860.

It might be stated at this point that the drum 54 on which the ribbed sheet and the liner are wound is positively driven in this instance by a motor 59 and reduction gearing in a gear box 60. From the shaft of the drum 54 a belt 61 drives the lower grooved drum 47 and therefore the V-belts which pass about this drum as well as around the upper drum 46.

After the ribbed sheet is vulcanized, the drum is removed from the vulcanizer, the sheet and the liner are unwound from the drum, the liner is restored to the drum 56, and the ribbed sheet is then generally cut into sections to form separators such, for example, as indicated at 61 in Fig. 9 where the ribs formed by this process are designated 62.

The ribs are porous and integral with the web of the separator and they cannot be distorted or broken off. Furthermore, a separator formed in this manner possesses very high porosity, and has sufficient strength and rigidity for all purposes in a battery. It might be mentioned that, unlike ribs of hard rubber or other material which have heretofore been attached to a separator pad or blank, the present ribbing does not to any material extent decrease the porosity of the separator as a whole or materially add to its electrical resistance. Further, it will be understood that whether the ribs are in the form of folds which stand at right angles to the web or face of the separator body or in the form of pleats folded down parallel to and in engagement with the face of the separator body, the parts of the fold are in the vulcanizing operation integrally united to each other and also to the body of the separator when the ribs are in the form of flat pleats.

In Fig. 10 I have shown in a somewhat enlarged view a cross-section of a portion of the separator 61 with the ribs 62 formed in accordance with the process and by the mechanism herein described. It will be noted that the rib at the edge of the sheet and at the two vertical edges of the separator shown in Fig. 9 are wider than the intermediate ribs. In order to form wider ribs at the edges of the separator, the outermost pair of V-belts 45 are spaced farther apart than the other pairs of belts as they pass over the upper drum 46, and it is for that same reason that the outermost crease-forming or fold-forming disks 48 of the upper set and the outermost disks 50 of the lower set are larger in diameter than the remainder, thus forming deeper folds along the edges of the sheet than the folds inwardly of the edges. While the separator 61 of Fig. 9 shows the two outermost ribs, i. e., the ribs along the vertical edges of the separator, wider than the other ribs, they may, if desired, be of the same width.

As stated before, the ribs may assume different forms, and in Fig. 11 I have shown a portion of a separator 61ª with ribs 62ª formed by folds in the sheet at right angles to the body of the separator. Ribs of this kind would be formed by omitting the rib flattening roll 53 shown in Figs. 1, 2 and 3. In Fig. 12 the ribs are of a still different shape the ribs being similar to box pleats. In this figure the separator is designated 61ᵇ and the ribs 62ᵇ. This form of rib can be obtained by employing a suitably shaped flattening roller in place of the smooth-surfaced roller 53.

By the process herein disclosed I obtain separators having the desired porosity, with pores of microscopic size, as in said application Serial No. 698,860 and in the Beckmann patents, with ribbing of the most desirable kind. Furthermore, from the beginning of the process, where the fabric is first treated with the coagulant prior to passing through the latex, to and through the rib forming part, the process is of a continuous nature, as a result of which the separators can be produced at low cost. The process is efficient not only from the cost standpoint but it results in separators of superior quality, these separators being superior to wooden separators so far as their life is concerned, and compare very favorably with wooden separators in porosity and cost.

While I have described my improved ribbing process as being carried out with a fabric sheet filled and coated with gelled or coagulated latex, it is not to be confined thereto because I regard it within the scope of my invention to employ separator forming material in strip or sheet form formed of other materials, woven or unwoven, and composed wholly or partly of porous material. For example, the process can be carried out with a strip or sheet of partly vulcanized rubber traversed by threads of the general character used in forming the well known thread-rubber separators. It was stated that following the vulcanizing operation after the ribbed sheet and the liner are removed from the drum 54 the sheet is generally cut into sections of the size of the finished separators. This is not always the case for the reason that the vulcanized ribbed strip may be employed for separator or insulating purposes in a storage battery without cutting the strip into individual separators. In accordance with an invention made by Samuel W. Rolph and described in application Serial No. 741,957, filed August 29, 1934, the plate insulation is in the form of unit insulation formed by folding back and forth a strip of separator or insulating material. The strip formed by the present invention is admirably adapted for that purpose.

As pointed out above, the rib-forming equipment here illustrated is designed for a strip of double separator width, that is to say, a strip which when cut in sections of unit or separator length will be divided at the middle so as to form two finished separators with such trimming as may be necessary. It will be understood, however, that the entire equipment may be designed to accommodate strips of any desired width.

In Fig. 13 I have illustrated somewhat conventionally and on a much enlarged scale a section of the separator where one of the ribs is formed. This shows how the various parts are vulcanized together, but, as a matter of fact, after the vulcanizing operation the rubber in the various folds and on the surfaces thereof is integrally united and forms one continuous body of rubber.

I therefore aim in my claims to cover all modifications which do not involve a departure from the spirit and scope of the invention as set forth in the appended claims.

Having thus described my invention, I claim:

1. The method of making ribbed separators which comprises forming on a porous strip a rubber gel from a dispersed rubber solution, folding the strip at intervals with the gel-coated sides of the folds in adhering relation, and vulcanizing the gel so as to form microporous rubber.

2. The method of making ribbed separators which comprises forming on a porous strip from a dispersed rubber solution a reticulous gel having interaggregate liquid-filled pores of microscopically visible size, folding portions of the strip along spaced parallel lines to form parallel ribbing with the gel-coated sides thereof in adhering relation, and vulcanizing the gel while the liquid remains interstitially included therein, thereby fixing the rubber in reticulous microporous structure.

3. The method of forming ribbed separators which comprises treating a porous strip so as to form a latex gel thereon, folding portions of the strips to form parallel ribs, pressing the sides of the folds together so as to cause them to adhere, and vulcanizing the gel into microporous rubber.

4. The method of forming ribbed separators which comprises treating a porous strip so as to form thereon a gel from a dispersed rubber solution, forming folds in the strip so as to produce parallel ribbing, bringing the gel-coated sides of the folds into engagement, deforming the folds to form ribs of the desired shape, and vulcanizing the gel so as to form microporous rubber.

LELAND E. WELLS.